United States Patent

Alesson et al.

[11] 3,776,254
[45] Dec. 4, 1973

[54] AERODYNAMIC CONDENSATE DISCHARGE TRAP AND SYSTEM

[75] Inventors: Thomas Alesson, Plains; Theodore B. Dennis, Wilkes-Barre, both of Pa.

[73] Assignee: Datron Systems, Inc. (Nicholson Division), Wilkes-Barre, Pa.

[22] Filed: Nov. 15, 1971

[21] Appl. No.: 198,741

[52] U.S. Cl. ............................... 137/183, 137/204
[51] Int. Cl. ................................. F16t 1/00
[58] Field of Search .................... 137/183, 200, 204, 137/195, 516.15

[56] References Cited
UNITED STATES PATENTS

| | | | |
|---|---|---|---|
| 3,664,363 | 5/1972 | Miyawaki | 137/183 |
| 2,945,505 | 7/1960 | Hansen | 137/183 |
| 2,506,306 | 5/1950 | Mantle | 137/516.15 |
| 3,275,020 | 9/1966 | Fujiwara | 137/195 |

*Primary Examiner*—Alan Cohan
*Attorney*—Henry N. Paul, Jr. et al.

[57] ABSTRACT

A bleed trap for piping systems containing air or other dry gas under pressure is described which includes a body adapted to engage a threaded opening in the system, and having inlet and outlet ports therein which respectively communicate with the upstream and downstream sides of the system. These ports terminate at a planar surface of the body which is normally sealed by a separate disc whose movement is restricted by an enclosing cap which covers the disc as well as the planar surface. The entire body and inlet thereof is sealingly covered by a covering cap which causes system air to be directed into the inlet port of the body. The outlet ports are restricted by a spring loaded element which yields as air, gas, or condensate is bled from the system.

7 Claims, 4 Drawing Figures

PATENTED DEC 4 1973

3,776,254

INVENTORS.
THOMAS ALESSON
THEODORE B. DENNIS
BY
Paul + Paul
ATTORNEYS.

AERODYNAMIC CONDENSATE DISCHARGE TRAP AND SYSTEM

BACKGROUND OF THE INVENTION

This invention relates generally to a bleed trap for use in compressed air and other non-steam gas systems to automatically evacuate condensation therefrom, and to a condensate discharge system.

Closed piping systems for supply of compressed air or other gasses than steam must be provided with means for disposing of condensed moisture in order to ensure the supply of gas only to the outlets thereof. Such supply is conventially made to laboratory facilities, paint sprayers, pneumatic tools and the like. Conventional means for disposing of condensate include manually operated valves, float operated valves and piston operated valves. The disadvantage of a manually operated valve system is the periodic attendance required. Float and piston operated systems are subject to corrosion in the linkages or close-fitting parts thereof.

SUMMARY OF THE INVENTION

A bleed trap for such compressed gas systems has now been discovered which is automatic in discharge of condensate and which requires only one simple disc-like moving part. The disc is loose-fitting, and together with the related functional trap parts may be readily replaced without major piping repair. An novel automatic condensate discharge system for air and other non-steam gases is thereby provided.

Accordingly, an object of the present invention is to provide a bleed trap which is small in size, automatic, inexpensive to manufacture and easy and economical to service.

Another object is to provide such a trap in the form of a unitary device which may be conveniently screwed into the valve seat boss of a body or casing permanently connected in a piping system.

Other objects of the invention will become apparent when the following description is read with reference to the accompanying drawings.

DESCRIPTION OF THE PREFERRED EMBODIMENTS

Figures 1, 2, 3, 4:
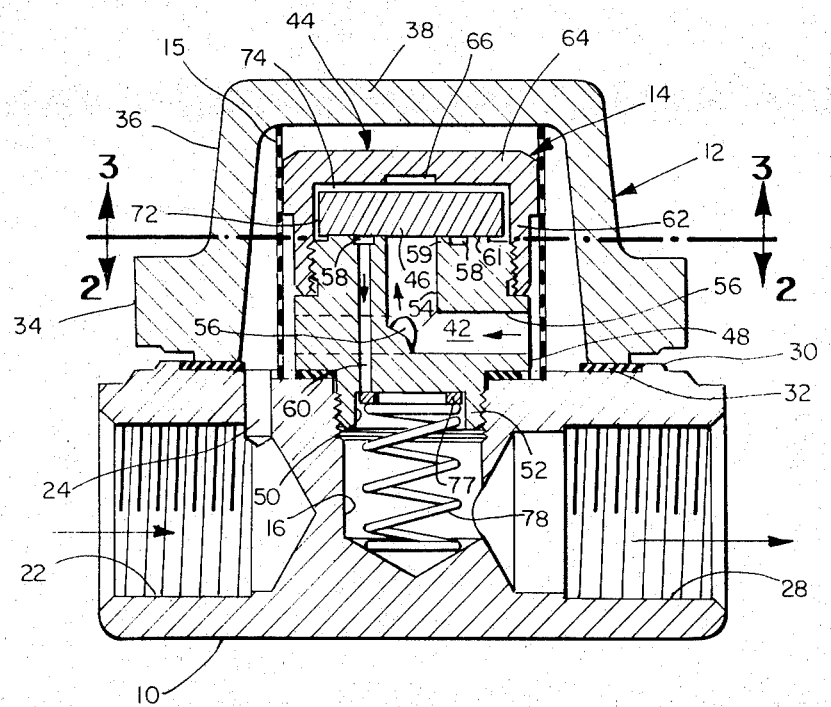
FIG. 1 is a longitudinal section through a bleed trap constructed in accordance with the invention and encased in a body adapted for being permanently connected in a pipe line.
FIG. 2 is a section on line II—II in FIG. 1 in the direction of the arrows II—II.
FIG. 3 is a section on line III—III in FIG. 1 in the direction of the arrows III—III.
FIG. 4 is a schematic drawing of a compressed gas system having in combination therewith an automatic condensate discharge trap.

The following description is directed to the specific embodiment of the bleed trap disclosed in the drawing. It is not addressed to the scope of the invention, which may be practiced in a variety of forms.

Apparatus constructed in accordance with the invention comprises a casing having a body member 10 and a cover 12 housing a bleed trap 14.

The body member 10 is provided with a central bore 16. One end portion of the body 10 is provided with an internally threaded inlet bore 22 communicating with a laterally extending bore 24. Communicating with the lower end portion of the central bore 16 is an internally threaded outlet bore 28 provided in the opposite end portion of the body 10. Body 10 has formed thereon a flange 30, which is fitted with a gasket 32.

Overlying the flange 30 and the gasket 32 is a flange 34 of the cover 12. Extending upwardly from the flange 34 is a wall 36 terminating in a horizontally extending top wall 38. The flange 34 is secured to the flange 30 by means of a plurality of bolts (not shown).

The bleed trap 14 comprises a housing having a base 42 and a cap 44 enclosing a sealing disc 46. A generally cylindrical foraminous screen 15 is sleeved about bleed trap 14 and extends between the underside of top wall 38 and body member 10.

The base 42 is provided with a main body portion 48 which is octagonal in form. The underside of the base 42 is provided with a lower central bore 50 forming a depending cylindrical part 52 threaded into the bore 16. Extending axially downwardly into the main body 48 is an upper central bore 54 communicating with three radially extending bores 56. Extending about the upper end of the upper central bore 54 is a groove 58, and extending axially downwardly through the main body 48 are three circumferentially equally spaced bores 60 placing the groove 58 in communication with the lower central bore 50. Between the upper central bore 54 and the groove 58 is an annular valve seat 59, and surrounding the groove 58 is an annular valve seat 61.

The cap 44 is provided with a cylindrical main body 62 closed at one end by a wall 64 in which there is formed a depression 66.

The disc 46 fits within the cap 44 and divides the space within the cap into a pressure chamber 74 above the disc and an annular restricted passage 72 between the wall 62 of the cap and the periphery of the disc. An annular washer 77 is loosely disposed within the lower central bore 50, and is yieldingly maintained in sealing relationship with bores 60 by a spring 78.

The general operation of this type of trap on steam applications is thoroughly familiar to those skilled in the art. The operation of this modified design on air or gas is as follows: air is admitted into the system and builds up pressure, the sealing disc 46 will remain in its initial position. If it is initially unseated, the increase of pressure in the system will in due course force air and condensate through the trap in an unobstructed manner. If the sealing disc 46 is initially in closed position, it will immediately open due to the pressure of the air or condensate acting against its underside at the inlet port 54, allowing free flow of air or condensate through the trap. This free flow from the system will cause the washer 77 to unseal bores 60, however the pressure of spring 78 will cause a flow restriction. As a result, liquid will be discharged freely, while the flow of air or gas will be restricted and some air or gas will pass through the restricted passage 72, enter the chamber 74, and build up pressure in this latter chamber. As this phenomenon continues and increases in intensity, the pressure in the chamber 74, acting against the sealing disc 46, will exert sufficient force thereon to force it down onto the inlet seat 59, thus stopping the flow of air or gas from the system and simultaneously engaging the sealing disc 46 with its seat 61 to effectively seal the chamber 74.

The sealing disc 46 will remain seated as long as the force exerted on the top of the disc 46 by the pressure in the chamber 74 exceeds the force exerted by the pressure in the system through the inlet port 54 against the bottom of said disc. Pressure in the chamber 74 will, however, gradually diminish, due to the inherent leakage of a flat metal-to-metal seal, so that in due course the force thereby exerted against the top of the sealing disc 46 will fall below the force exerted on the bottom of the disc 46 at port 54. When this condition is reached, the pressure in the system will cause an unseating of the sealing disc 46 and fluid is again free to flow unobstructedly through the trap until the operations hereinbefore described are repeated.

Air and condensate enter the device at inlet 22, pass upwardly through bore 24, circulate in the annular chamber formed between trap 14 and cover 12, and pass through the foraminous screen 15. They then pass horizontally inwardly through the three bores 56 and vertically upwardly through the inlet port 54. When the sealing disc is raised from its seat, some of the air passes via the restricted passage 72 into the pressure chamber 74 while most of the air and condensate pass through the bores 60, 50, and 16 and horizontally through bore 26 for discharge through outlet bore 28.

It will readily be apparent that when body 10 is connected in a pipe line, it is not necessary to remove it from the line to repair the trap mechanism. It is merely necessary to remove cover 12, screw out the trap 14 as a unit and substitute therefor a fresh trap, and replace and cover 12.

Referring to FIG. 4, there is shown a system for automatic condensate removal from compressed air systems and systems utilizing other compressed gases than steam, comprising (1) compressed gas supply means 80, (2) piping means 82, (3) compressed gas utility means 84, (4) well means 86 connected into said piping means below the lowest level thereof, and (5) automatic condensate discharge means 88 connected into said well means, wherein said discharge means comprises a trap constructed as hereinbefore described. Such trap is a functional part of the system shown in FIG. 4, enabling such a system, within a practical operating range of from 1–600 psig, to intermittently discharge condensate which accumulates in the well 86.

What is claimed is:

1. The combination comprising a casing having inlet and outlet openings adapted for connection of said casing in a pipe line, and an aerodynamic trap housed within said casing and operatively interposed between said inlet and outlet openings including a hollow housing; means detachably affixing said housing to said casing; a sealing member dividing the hollow within said housing into outlet and pressure chambers, said inlet opening of the casing communicating with said outlet chamber and there terminating in an inlet valve seat at which the inlet will be sealed when engaged by the sealing member, said outlet chamber communicating with said outlet opening of the casing by means of an outlet passage through the means detachably affixing said housing to said casing; a pressure retaining valve seat positioned remote from and independent of the inlet valve seat, said sealing member being shaped to simultaneously engage with both of said valve seats to seal the inlet and simultaneously seal the pressure chamber from the outlet chamber, and being retractable from both seats to allow the free flow of fluid through the housing and also to permit the passage of fluid from the outlet chamber into the pressure chamber; and spring-biased valve means within said outlet opening proportionally yieldingly responsive to pressure in said outlet passage, normally in sealing relationship with said passage, in the absence of fluid flow therethrough.

2. The combination according to claim 1, wherein the casing comprises a body member, a cover removably affixed to said body member and extending over the same to afford a hollow within said casing, and the trap is seated upon said body member independently of said cover.

3. The combination according to claim 2, wherein the detachable connection of the hollow housing of the trap to the casing is a threaded connection.

4. The combination according to claim 2, wherein a cylindrical formation depending from the bottom of the hollow housing of the trap is projected into the body member of the casing, and the passage leading from the outlet chamber to the outlet opening of the casing extends axially through said cylindrical formation.

5. The combination according to claim 2, wherein a cylindrical formation extends downwardly into a bore in the body member of said casing, and the passage leading from the outlet chamber to the outlet opening of the casing extends axially through said cylindrical formation and through a portion of said bore extending downwardly below said cylindrical formation.

6. An automatic condensate discharge system comprising in combination (1) compressed gas supply means, (2) compressed gas utility means, (3) piping means interconnecting said supply means and utility means, (4) well means connected into said piping means in such manner as to collect condensate which forms within said piping means, and (5) a casing having an inlet and outlet opening, the inlet opening being connected into said well means; an aerodynamic trap housed within said casing and operatively interposed between said inlet and outlet openings including a hollow housing; means detachably affixing said housing to said casing; a sealing member dividing the hollow within said housing into outlet and pressure chambers, said inlet opening of the casing communicating with said outlet chamber and there terminating in an inlet valve seat at which the inlet will be sealed when engaged by the sealing member, said outlet chamber communicating with said outlet opening of the casing by means of an outlet passage through the means detachably affixing said housing to said casing; a pressure retaining valve seat positioned remote from and independent of the inlet valve seat, said sealing member being shaped to simultaneously engage with both of said valve seats to seal the inlet and simultaneously seal the pressure chamber from the outlet chamber, and being retractable from both seats to allow free flow of fluid through the housing and also to permit the passage of fluid from the outlet chamber into the pressure chamber; and spring-biased valve means within said outlet opening proportionally yieldingly responsive to pressure in said outlet passage, normally in sealing relationship with said passage, in the absence of fluid flow therethrough.

7. The system of claim 6 wherein said sealing means is adapted to function at pressures in the range of from about 1 psig to about 600 psig.

* * * * *